(12) United States Patent
Wu (10) Patent No.: US 8,478,806 B2
(45) Date of Patent: Jul. 2, 2013

(54) METHOD FOR DETERMINING SAMPLING RATE AND DEVICE THEREFOR

(75) Inventor: Chi-Hung Wu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 483 days.

(21) Appl. No.: 12/822,196

(22) Filed: Jun. 24, 2010

(65) Prior Publication Data

US 2011/0289129 A1 Nov. 24, 2011

(30) Foreign Application Priority Data

May 18, 2010 (TW) .............................. 99115785 A (51) Int. Cl.
  *G06F 17/10* (2006.01)
(52) U.S. Cl.
  USPC ........................................................ 708/311
(58) Field of Classification Search
  None
  See application file for complete search history.

(56) References Cited

U.S. PATENT DOCUMENTS

| 6,182,101 B1 * | 1/2001 | Vahatalo et al. ............... 708/313 |
| 2006/0077204 A1 * | 4/2006 | Pfister et al. ................... 345/424 |
| 2011/0261969 A1 * | 10/2011 | Elkhatib et al. ................. 381/22 |

* cited by examiner

*Primary Examiner* — David H Malzahn
(74) *Attorney, Agent, or Firm* — Jianq Chyun IP Office (57) ABSTRACT

A method and a device for determining sampling rate are provided. The device receives an input signal of SPDIF. The method includes following steps. A plurality of multiple values between a plurality of bi-phase clock frequencies of the input signal and a system frequency are obtained, and a first weighted average and a second weighted average are calculated according to a first filter range, a second filter range and the multiple values. When a first difference is greater than a second difference, the sampling rate is set to a first sampling rate. Otherwise, the sampling rate is set to a second sampling rate. The first difference and the second difference are obtained according to the first weighted average, the second weighted average and a frequency threshold. The method determines the sampling rate rapidly according to weighted averages adjusted by filter ranges, reduces a probability of erroneous judgment and saves memory.

12 Claims, 5 Drawing Sheets

Multiple value: 17, 18, 19, 20, 21
(thH)

First weighted sequence: 0, 1, 1, 1, 1

Multiple value: 17, 18, 19, 20, 21
(thL)

Second weighted sequence: 1, 1, 1, 1, 0

TABLE (7)

| Buffer size | 10 | 20 | 30 | 40 | 50 | 60 | 70 | 80 | 90 | 100 | 100 |
|---|---|---|---|---|---|---|---|---|---|---|---|
| Present embodiment | 59022 | 5328 | 551 | 0 | 0 | 0 | 0 | 0 | 0 | 0 | 0 |
| Conventional determination method | 60132 | 17297 | 10553 | 5001 | 2452 | 197 | 58 | 5 | 1 | 0 | 0 |

METHOD FOR DETERMINING SAMPLING RATE AND DEVICE THEREFOR

CROSS-REFERENCE TO RELATED APPLICATION

This application claims the priority benefit of Taiwan application serial no. 99115785, filed on May 18, 2010. The entirety of the above-mentioned patent application is hereby incorporated by reference herein and made a part of this specification

BACKGROUND

1. Field of the Invention

The invention relates to a sampling rate technique of a Sony/Philips digital interface (SPDIF). More particularly, the invention relates to a technique for rapidly determining a sampling rate of an input signal according to weighted averages adjusted by filter ranges, so as to reduce a probability of erroneous judgment and save memory.

2. Description of Related Art

A Sony/Philips digital interface (SPDIF) is a digital audio transmission interface, which generally uses optical fibres and coaxial cables to transmit data to ensure correctness and synchronization of the data, so that an output result may have a high fidelity. Therefore, the SPDIF is widely used in DVD players and CD players supporting a digital theatre system (DTS) or Dolby digital.

Moreover, the SPDIF uses a bi-phase mark code (BMC) to mix a sampling frequency and its sampling information for transmission. Therefore, a transmitting end and a receiving end of the SPDIF only require one data line for transmitting and receiving data, and the receiving end of the SPDIF has to separate the sampling frequency from an input signal, so as to correctly sample the input signal. A standard SPDIF format can sample the input signals of four sampling rates, and the four sampling rates are respectively 32 KHz, 44.1 KHz, 48 KHz and 96 KHz, wherein the sampling rates of 44.1 KHz (generally used for CD digital audio sampling) and 48 KHz (generally used for DVD digital audio sampling) are relatively closed, so that the receiving end of the SPDIF may have a relatively high probability of erroneous judgment when determining these two sampling rates.

An example is provided below for description. In the input signal in accordance to the SPDIF, each sampling result is transmitted by 32-bit, which includes left and right channel information, while each bit is required to be sampled twice, so that bi-phase clock frequencies $BCF_{44.1\ Khz}$ and $BCF\ 48_{Khz}$ of 44.1 KHz and 48 KHz are represented by following equations (1) and (2):

$$BCF_{44.1\ Khz}=44.1\ Khz \times 32 \times 2 \times 2 = 5.6448\ Mhz \quad (1)$$

$$BCF_{48\ Khz}=48\ Khz \times 32 \times 2 \times 2 = 6.144\ Mhz \quad (2)$$

During determination of the sampling rate, the input signal carrying the sampling rates of 44.1 KHz and 48 KHz can be determined according to the bi-phase clock frequencies $BCF_{44.1\ Khz}$ and $BCF\ 48_{Khz}$. However, when the input signal is influenced by factors such as clock jitter, quality difference of transmitting ends and sampling accuracy, etc., the bi-phase clock frequencies BCF are hard to be recognized due to closed values thereof, so that the receiving end of the SPDIF may have a relatively high probability of erroneous judgment when determining the two sampling rates. To reduce the probability of erroneous judgment, determination times of the sampling rate have to be increased, so as to correctly determine the sampling rate according to an average of multiple sampling results, though a memory volume is accordingly increased, and the time required for determination is also increased.

SUMMARY

The invention is directed to a method for determining a sampling rate. In the method, an input signal of a Sony/Philips digital interface (SPDIF) is received, and a sampling rate of the input signal is rapidly determined according to weighted averages adjusted by filter ranges, so as to reduce a probability of erroneous judgment and save memory required for determination.

According to another aspect, the invention is directed to a device for determining a sampling rate. The device receives an input signal of an SPDIF, and adjusts weighted averages according to filter ranges, so as to rapidly determine the sampling rate, and accordingly reduce a probability of erroneous judgment and save memory.

The invention provides a method for determining a sampling rate, which is used for determining a sampling rate of an input signal of a Sony/Philips digital interface (SPDIF). The method for determining the sampling rate includes the following steps. A plurality of multiple values between a plurality of bi-phase clock frequencies of the input signal and a system frequency are obtained, and a first weighted sequence is adjusted according to a first filter range, so as to calculate a first weighted average according to the first weighted sequence and the multiple values. Then a second weighted sequence is adjusted according to a second filter range, so as to calculate a second weighted average according to the second weighted sequence and the multiple values. Then, when a first difference is greater than a second difference, the sampling rate is set to a first sampling rate. Otherwise, the sampling rate is set to a second sampling rate, wherein the first difference is obtained according to the first weighted average and a frequency threshold, and the second difference is obtained according to the second weighted average and the frequency threshold.

In an embodiment of the invention, the first filter range is greater than a high-pass threshold, and the second filter range is smaller than a low-pass threshold.

In an embodiment of the invention, the step of adjusting the first weighted sequence according to the first filter range and calculating the first weighted average according to the first weighted sequence and the multiple values includes following steps. The multiple values smaller than or equal to the high-pass threshold are removed, and then an arithmetic average of the remained multiple values is calculated to obtain the first weighted average. Moreover, the step of adjusting the second weighted sequence according to the second filter range and calculating the second weighted average according to the second weighted sequence and the multiple values includes following steps. The multiple values greater than or equal to the low-pass threshold are removed, and then an arithmetic average of the remained multiple values is calculated to obtain the second weighted average.

In an embodiment of the invention, the step of obtaining the multiple values includes following steps. The bi-phase clock frequencies at different time points are obtained according to the input signal, and the system frequency is divided by the bi-phase clock frequencies, so as to obtain the multiple values.

In an embodiment of the invention, the first difference is an absolute value of the first weighted average minus the frequency threshold, and the second difference is an absolute value of the second weighted average minus the frequency threshold.

In an embodiment of the invention, the method for determining the sampling rate further includes adjusting or changing the first filter range, the second filter range and the frequency threshold according to the system frequency.

According to another aspect, the invention provides a device for determining a sampling rate, which is used for determining a sampling rate of an input signal of a Sony/Philips digital interface (SPDIF). The device for determining the sampling rate includes a frequency sampling unit, a filter calculation unit and a determination unit. The frequency sampling unit is used for obtaining a plurality of multiple values between a plurality of bi-phase clock frequencies of the input signal and a system frequency. The filter calculation unit is coupled to the frequency sampling unit, and adjusts a first weighted sequence according to a first filter range, and calculates a first weighted average according to the first weighted sequence and the multiple values. The filter calculation unit also adjusts a second weighted sequence according to a second filter range, and calculates a second weighted average according to the second weighted sequence and the multiple values. The determination unit is coupled to the filter calculation unit, and when a first difference is greater than a second difference, the determination unit sets the sampling rate to a first sampling rate. Otherwise, the determination unit sets the sampling rate to a second sampling rate, wherein the first difference is obtained according to the first weighted average and a frequency threshold, and the second difference is obtained according to the second weighted average and the frequency threshold.

In an embodiment of the invention, the first filter range is greater than a high-pass threshold, and the second filter range is smaller than a low-pass threshold.

In an embodiment of the invention, the filter calculation unit includes a high-pass calculation unit and a low-pass calculation unit. The high-pass calculation unit removes the multiple values smaller than or equal to the high-pass threshold, and calculates an arithmetic average of the remained multiple values to obtain the first weighted average. The low-pass calculation unit removes the multiple values greater than or equal to the low-pass threshold, and calculates an arithmetic average of the remained multiple values to obtain the second weighted average.

In an embodiment of the invention, the device for determining the sampling rate further includes a storage unit coupled to the frequency sampling unit for receiving and storing the multiple values.

In an embodiment of the invention, the device for determining the sampling rate further includes a coefficient setting unit coupled to the frequency sampling unit and the filter calculation unit. The coefficient setting unit adjusts or changes the first filter range, the second filter range and the frequency threshold according to the system frequency.

According to the above descriptions, in the embodiments of the invention, multiple values are obtained according to the bi-phase clock frequencies of different time points, and the weighted sequences are adjusted according to filter ranges, so as to calculates the first weighted average and the second weighted average according to the weighted sequences and the multiple values. Then, a sampling rate tendency of the input signal is determined according to the first weighted average, the second weighted average and the frequency threshold, so as to reduce a probability of erroneous judgment and rapidly determine the sampling rate to save a required memory.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
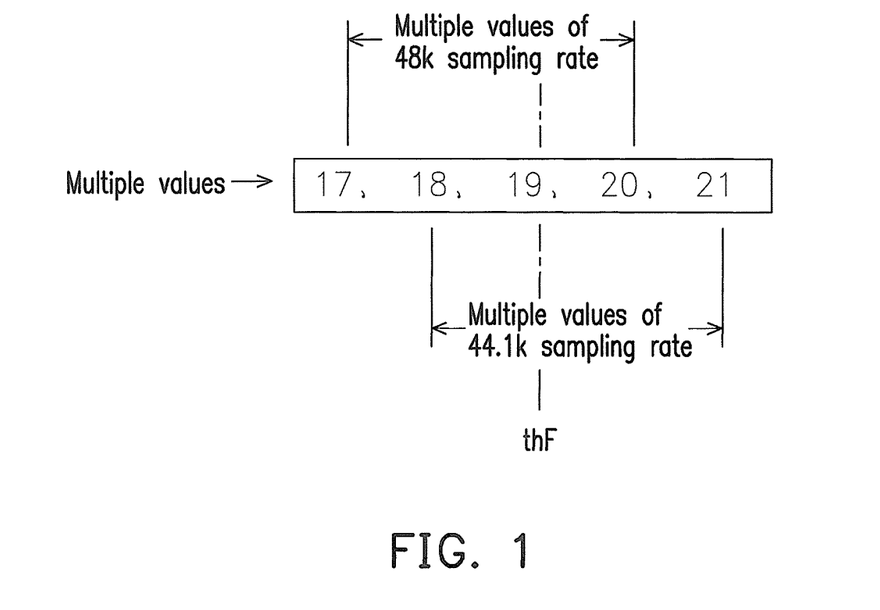
FIG. 1 is a schematic diagram illustrating a method for determining a sampling rate according to an embodiment of the invention.

Referring to FIG. 1, FIG. 1 is a schematic diagram illustrating a method for determining a sampling rate SR of an input signal IS of a Sony/Philips digital interface (SPDIF). In the present embodiment, a system frequency SF is set to 108 Mhz, and bi-phase clock frequencies $BCF_{48\ Khz}$ and $BCF\ 44.1_{Khz}$ corresponding to sampling rates 48 KHz and 44.1 KHz are about 6.144 Mhz and 5.6448 Mhz (as that shown in following equations (1) and (2)). Therefore, quotients (i.e. multiple values) obtained by dividing the system frequency SF with the bi-phase clock frequencies $BCF_{48\ Khz}$ and $BCF\ 44.1_{Khz}$ are shown in following equations (3) and (4):

$$\frac{SF}{BCF_{44.1\ Khz}} = \frac{108\ \text{Mhz}}{5.6448\ \text{Mhz}} \cong 19.13256 \qquad (3)$$

$$\frac{SF}{BCF_{48\ Khz}} = \frac{108\ \text{Mhz}}{6.144\ \text{Mhz}} \cong 17.57812 \qquad (4)$$

Limited by hardware, the multiple values can be only recorded by integers, so that in the present embodiment, a frequency threshold thF is set to 19 since 19 is an integer between 17.57812 and 19.13256. In the present embodiment, if an arithmetic average of the multiple values is greater than 19 (the frequency threshold thF), the sampling rate SR is set to be 44.1 KHz. Otherwise, the sampling rate SR is set to 48 KHz.

Referring to FIG. 1 again, due to influences of clock jitter, quality difference of transmitting ends, etc., when the sampling rate is 48 KHz, most of the multiple values are drifted within an integer range of 17-20, and when the sampling rate is 44.1 KHz, the multiple values are drifted within an integer range of 18-21, though some multiple values occasionally exceed the above integer ranges. In a conventional determination method, since the arithmetic average is used as a calculation method, when a number of the multiple values is relatively less, the part of the multiple values exceeding the integer range may have a great influence on the arithmetic average, so as to cause an erroneous judgment.

An example is provided below for detailed description, as shown in a table (1), assuming the input signal IS has the sampling rate of 44.1 KHz, and 10 multiple values are accordingly generated.

TABLE 1

| Multiple value | 17 | 17 | 18 | 19 | 20 |
|---|---|---|---|---|---|
| (44.1 KHz) | 21 | 19 | 19 | 20 | 19 |

The arithmetic average of the multiple values of the table (1) is 18.9, and since 18.9 (the arithmetic average of the multiple values) is smaller than 19 (the frequency threshold thF), the sampling rate SR is set to 48 KHz, though the original sampling rate of the input signal IS is 44.1 KHz, so that an erroneous judgment is occurred. A method for resolving such erroneous judgment is to obtain more multiple values to obtain the average greater than 19 (the frequency threshold thF), so as to achieve the correct determination, though such method may increase the time for determination and increase the required memory volume.

Figure 2:
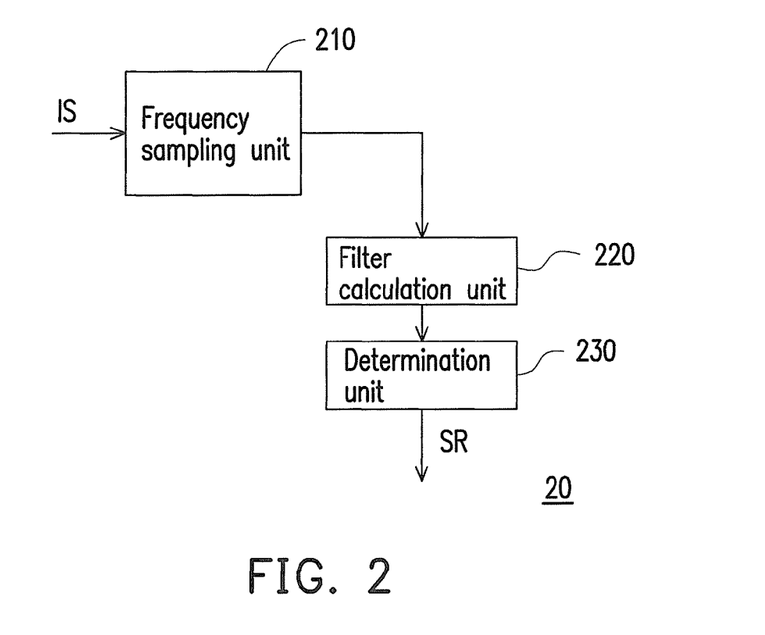
FIG. 2 is a block diagram illustrating a device for determining a sampling rate according to an embodiment of the invention.

Therefore, an embodiment of the invention is provided below. FIG. 2 is a block diagram illustrating a device 20 for determining a sampling rate according to an embodiment of the invention. Referring to FIG. 2, the device 20 for determining the sampling rate receives the input signal IS of the SPDIF for determining the sampling rate SR. The device 20 for determining the sampling rate includes a frequency sampling unit 210, a filter calculation unit 220 and a determination unit 230. The frequency sampling unit 210 is used for obtaining a plurality of multiple values between a plurality of bi-phase clock frequencies BCF of the input signal IS and a system frequency SF. The filter calculation unit 220 is coupled to the frequency sampling unit 210, and adjusts a first weighted sequence according to a first filter range (which is, for example, greater than a high-pass threshold thH), and calculates a first weighted average according to the first weighted sequence and the multiple values. The filter calculation unit 220 also adjusts a second weighted sequence according to a second filter range (which is, for example, smaller than a low-pass threshold thL), and calculates a second weighted average according to the second weighted sequence and the multiple values.

Referring to FIG. 2, the determination unit 230 is coupled to the filter calculation unit 220, and is used for calculating a first difference D1 according to the first weighted average and the frequency threshold thF, and calculating a second difference D2 according to the second weighted average and the frequency threshold thF. When the first difference D1 is greater than the second difference D2, the determination unit 230 sets the sampling rate SR to a first sampling rate (for example, 44.1 KHz). Otherwise, the determination unit 230 sets the sampling rate SR to a second sampling rate (for example, 48 KHz).

Figure 3:
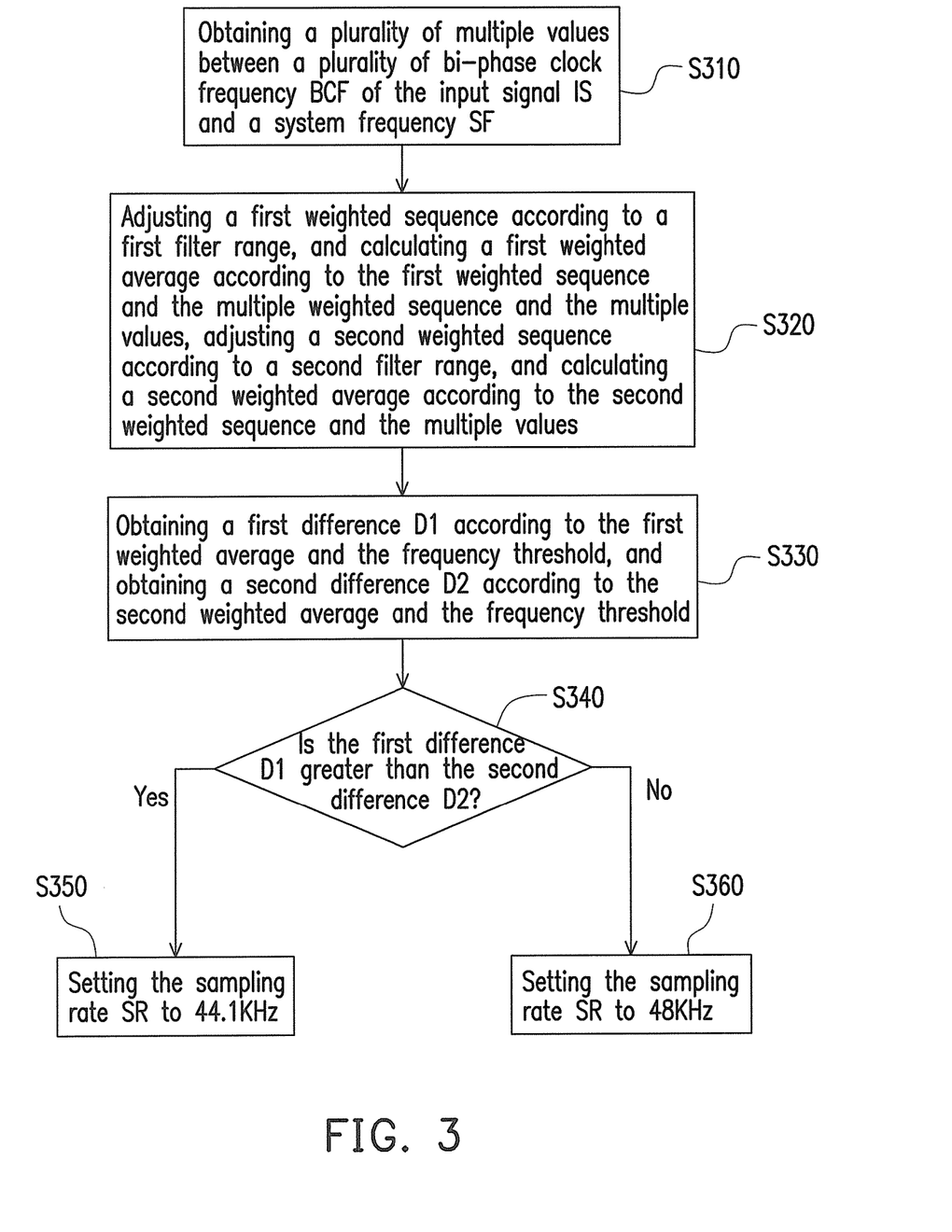
FIG. 3 is a flowchart illustrating a method for determining a sampling rate according to an embodiment of the invention.

To fully convey the spirit of the invention to those skilled in the art, detailed steps of a method for determining a sampling rate are described below. FIG. 3 is a flowchart illustrating a method for determining a sampling rate according to an embodiment of the invention. Referring to FIG. 2 and FIG. 3, in step S310, the frequency sampling unit 210 receives the input signal IS in accordance to the SPDIF, so as to obtain a plurality of bi-phase clock frequencies BCF corresponding to different time points according to the input signal IS. Then, the system frequency SF is divided by the bi-phase clock frequencies BCF to obtain a plurality of multiple values. In the present embodiment, obtaining of 10 multiple values is taken as an example, and assuming the input signal IS has a sampling rate of 44.1 KHz, wherein the multiple values obtained by the frequency sampling unit 210 are as that shown in the table (1).

Figure 4:
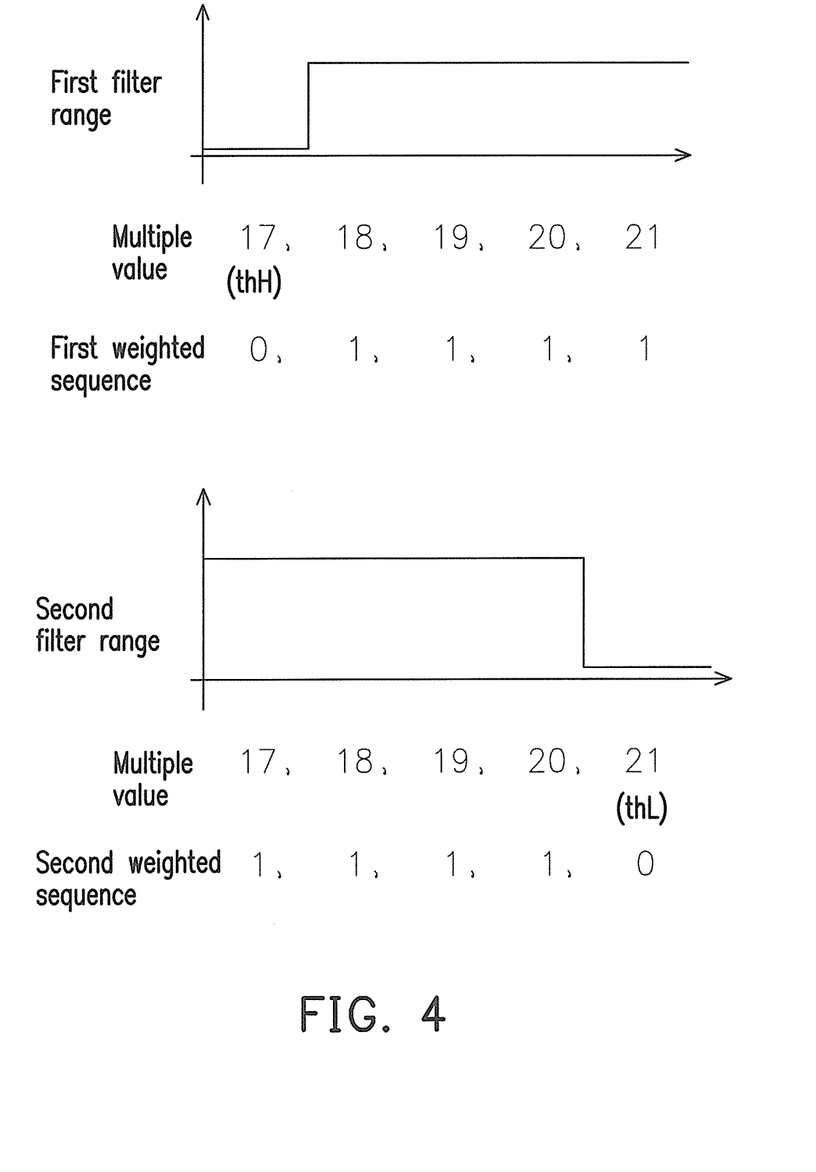
FIG. 4 is a schematic diagram illustrating a method for setting weighted sequences according to filter ranges according to an embodiment of the invention.

Then, in step S320, the filter calculation unit 220 adjusts a first weighted sequence and a second weighted sequence according to a first filter range (which is, for example, greater than the high-pass threshold thH) and the second filter range (which is, for example, smaller than the low-pass threshold thL), and respectively calculates a first weighted average and a second weighted average according to the first weighted sequence, the second weighted sequence and the multiple values. In the present embodiment, the high-pass threshold thH is set to 17 and the low-pass threshold is set to 21 according to the system frequency SF. Referring to FIG. 4, FIG. 4 is a schematic diagram illustrating a method for setting weighted sequences according to filter ranges according to an embodiment of the invention. As shown in FIG. 4, the first weighted sequence and the second weighted sequence of the present embodiment respectively have weighted values corresponding to the multiple values, and those skilled in the art can determine how to set the weighted values within/out of the filter range according to an actual design requirement. In the present embodiment, the filter calculation unit 220 sets the weighted values corresponding to the multiple values out of the first filter range (i.e. smaller than or equal to 17) as 0, so as to remove the multiple values smaller than or equal to 17, though the invention is not limited thereto. In other embodiments, the filter calculation unit 220 can also reduce the weighted values (for example, from 1 to 0.1) corresponding to the multiple values out of the first filter range, so as to reduce an influence of the multiple values out of the first filter range, or increase the weighted values (for example, from 1 to 1.5) corresponding to the multiple values within the first filter range, so as to increase an influence of the multiple values within the first filter range, and detailed description thereof is not repeated.

Referring to FIG. 4 again, the filter calculation unit 220 sets the weighted values corresponding to the multiple values out of the first filter range (i.e. smaller than or equal to 17) as 0, and sets the weighted values corresponding to the multiple values within the first filter range (i.e. greater than 17) as 1, so as to achieve an effect similar as that of a high-pass filter, which can remove all of the multiple values smaller than or equal to 17. The multiple values of the table (1) is rectified to obtain a following table (2), in which the strikethroughs represent the removed multiple values.

TABLE 2

| Multiple value | ~~17~~ | ~~17~~ | 18 | 19 | 20 |
|---|---|---|---|---|---|
| (44.1 KHz) | 21 | 19 | 19 | 20 | 19 |

In this way, an arithmetic average of the remained multiple values is calculated, i.e., the remained multiple values in the table (2) are summed and then divided by 8, so as to obtain a first weighted average $N_{hp}$ (in the present embodiment, the first weighted average $N_{hp}$ is about 19.375).

Similarly, the filter calculation unit 220 also sets the weighted values corresponding to the multiple values out of the second filter range (i.e. greater than or equal to 21) as 0, and sets the weighted values corresponding to the multiple values within the second filter range (i.e. smaller than 21) as 1, so as to achieve an effect similar as that of a low-pass filter, which can remove all of the multiple values greater than or equal to 21. The multiple values of the table (1) is rectified to obtain a following table (3), in which the strikethroughs represent the removed multiple values.

TABLE 3

| Multiple value (44.1 KHz) | 17 ~~21~~ | 17 19 | 18 19 | 19 20 | 20 19 |
|---|---|---|---|---|---|

In this way, an arithmetic average of the remained multiple values is calculated, i.e., the remained multiple values in the table (3) are summed and then divided by 9, so as to obtain a second weighted average $N_{lp}$ (in the present embodiment, the second weighted average $N_{lp}$ is about 18.66667).

Referring to FIG. 2 and FIG. 3 again, after the filter calculation unit 220 calculates the first weighted average $N_{hp}$ and the second weighted average $N_{lp}$, a step S330 is executed, by which the determination unit 230 calculates the first difference D1 according to the first weighted average $N_{hp}$ and the frequency threshold thF, and calculates the second difference D2 according to the second weighted average $N_{lp}$ and the frequency threshold thF, a calculation method thereof is as that shown in following equations (5) and (6):

$$D1=|N_{hp}-thF|=|19.375-19|=0.375 \tag{5}$$

$$D2=|N_{lp}-thF|=|18.66667-19|=0.33333 \tag{6}$$

Namely, the first difference D1 is an absolute value of the first weighted average $N_{hp}$ minus the frequency threshold thF, and the second difference D2 is an absolute value of the second weighted average $N_{lp}$ minus the frequency threshold thF. Then, in step S340, the determination unit 230 determines whether the first difference D1 is greater than the second difference, so as to determine whether the sampling rate of the multiple values tends to be greater than or smaller than the frequency threshold thF. In the present embodiment, since the first difference D1 (0.375) is greater than the second difference D2 (0.33333), a step S350 is executed, by which the determination unit 230 sets the sampling rate to 44.1 KHz, i.e. a CD audio sampling rate. In the present embodiment, the correct sampling rate SR can be rapidly determined according to the first weighted average, the second weighted average and the frequency threshold thF, so as to reduce a probability of erroneous judgment and a memory volume required for determining the sampling rate SR.

Moreover, another example is provided below to further describe the embodiment of the invention. Referring to FIG. 2 and FIG. 3, in step S310, the frequency sampling unit 210 receives the input signal IS in accordance to the SPDIF, so as to obtain a plurality of bi-phase clock frequencies BCF. Obtaining of 10 multiple values (shown in a following table (4)) is taken as an example, and assuming the input signal IS has the sampling rate of 48 KHz.

TABLE 4

| Multiple value (48 KHz) | 21 21 | 17 18 | 18 19 | 18 20 | 20 19 |
|---|---|---|---|---|---|

The arithmetic average of the multiple values of the table (4) is 19.1. Since 19.1 (the arithmetic average of the multiple values) is greater than 19 (the frequency threshold thF), the sampling rate SR is set to 44.1 KHz according to the conventional determination method, so that an erroneous judgment is occurred.

After enough multiple values are obtained, the step S320 is executed, by which the filter calculation unit 220 removes all of the multiple values smaller than or equal to 17 (i.e. the high-pass threshold thH) according to the first weighted sequence of FIG. 4, so that the multiple values of the table (4) is rectified to obtain a following table (5), in which the strikethroughs represent the removed multiple values.

TABLE 5

| Multiple value (48 KHz) | 21 21 | ~~17~~ 18 | 18 19 | 18 20 | 20 19 |
|---|---|---|---|---|---|

In this way, an arithmetic average of the remained multiple values is calculated according to the table (5), i.e., the remained multiple values in the table (5) are summed and then divided by 9, so as to obtain the first weighted average $N_{hp}$ (in the present embodiment, the first weighted average $N_{hp}$ is about 19.33333).

Moreover, the filter calculation unit 220 also removes all of the multiple values greater than or equal to 21 (i.e. the low-pass threshold thL) according to the second weighted sequence of FIG. 4, so that the multiple values of the table (4) is rectified to obtain a following table (6), in which the strikethroughs represent the removed multiple values.

TABLE 6

| Multiple value (48 KHz) | ~~21~~ ~~21~~ | 17 18 | 18 19 | 18 20 | 20 19 |
|---|---|---|---|---|---|

In this way, an arithmetic average of the remained multiple values is calculated according to the table (6), i.e., the remained multiple values in the table (6) are summed and then divided by 8, so as to obtain the second weighted average $N_{lp}$ (in the present embodiment, the second weighted average $N_{lp}$, is about 18.625).

In the step S330, the determination unit 230 calculates the first difference D1 and the second difference D2 according to following equations (7) and (8):

$$D1=|N_{hp}-thF|=|19.33333-19|=0.33333 \tag{7}$$

$$D2=|N_{lp}-thF|=|18.625-19|=0.375 \tag{8}$$

Then, since the first difference D1 (0.33333) is smaller than the second difference D2 (0.375), a step S360 is executed, by which the determination unit 230 sets the sampling rate SR to 48 KHz, i.e. a DVD digital audio sampling rate. The other details of the present embodiment are included in the aforementioned embodiments, and therefore detailed descriptions thereof are not repeated.

Figure 5:
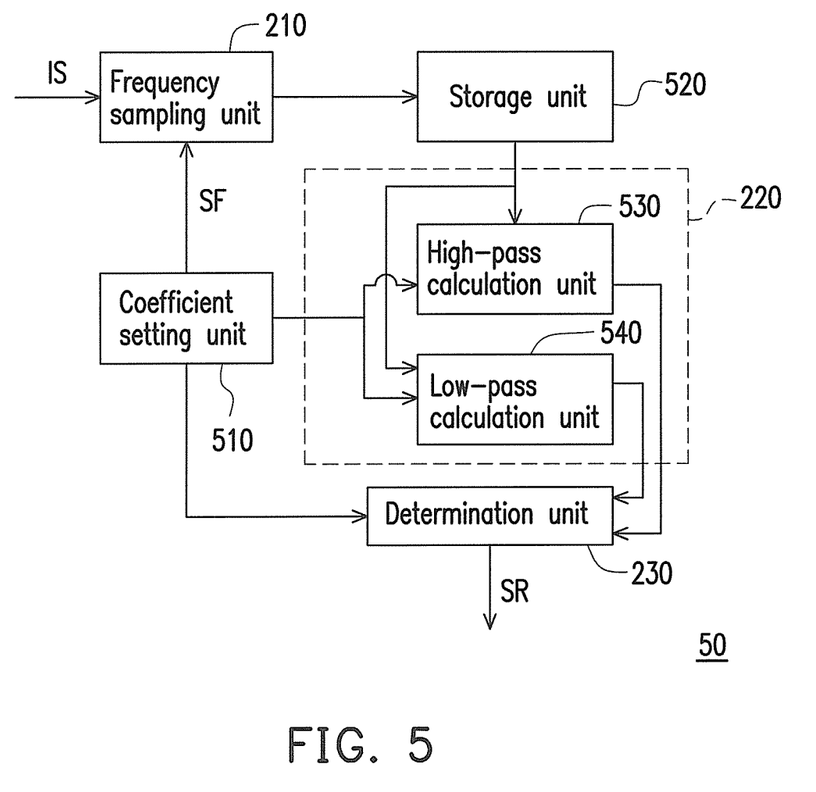
FIG. 5 is a block diagram illustrating a device for determining a sampling rate according to another embodiment of the invention.

In the filter calculation unit 220, a counter can be used to count a number of the received multiple values, and an adder can be used to calculate the first weighted average and the second weighted average, so that a storage unit is not required by the device 20 for determining the sampling rate SR, though the invention is not limited thereto. Referring to FIG. 5, FIG. 5 is a block diagram illustrating a device 50 for determining the sampling rate according to another embodiment of the invention. The present embodiment is similar to the above embodiment, so that the same operation methods are not repeated. A difference there between is that the device 50 for determining the sampling rate may include a storage unit 520, which is coupled to the frequency sampling unit 210 and the filter calculation unit 220. The storage unit 520 is used for receiving and storing the multiple values, so that the filter calculation unit 220 may calculate the first weighted average and the second weighted average according to the multiple values stored in the storage unit 520.

Referring to FIG. 5 again, the device 50 for determining the sampling rate may further include a coefficient setting unit 510, which is coupled to the frequency sampling unit 210, the filter calculation unit 220 and the determination unit 230. The coefficient setting unit 510 transmits the system frequency SF to the frequency sampling unit 210, so as to obtain the multiple values according to the input signal IS. If the device 50 for determining the sampling rate can change the system frequency SF by itself, the coefficient setting unit 510 can also adjust or change the first filter range and the second filter range in the filter calculation unit 220 and the frequency threshold thF in the determination unit 230 according to the system frequency SF.

On the other hand, the filter calculation unit 220 of the present embodiment may also include a high-pass calculation unit 530 and a low-pass calculation unit 540. The high-pass calculation unit 530 adjusts a first weighted sequence according to a first filter range (which is, for example, greater than a high-pass threshold thH), and calculates a first weighted average $N_{hp}$ according to the first weighted sequence and the multiple values. The low-pass calculation unit 540 also adjusts a second weighted sequence according to a second filter range (which is, for example, smaller than a low-pass threshold thL), and calculates a second weighted average $N_{lp}$ according to the second weighted sequence and the multiple values.

Figure 6:
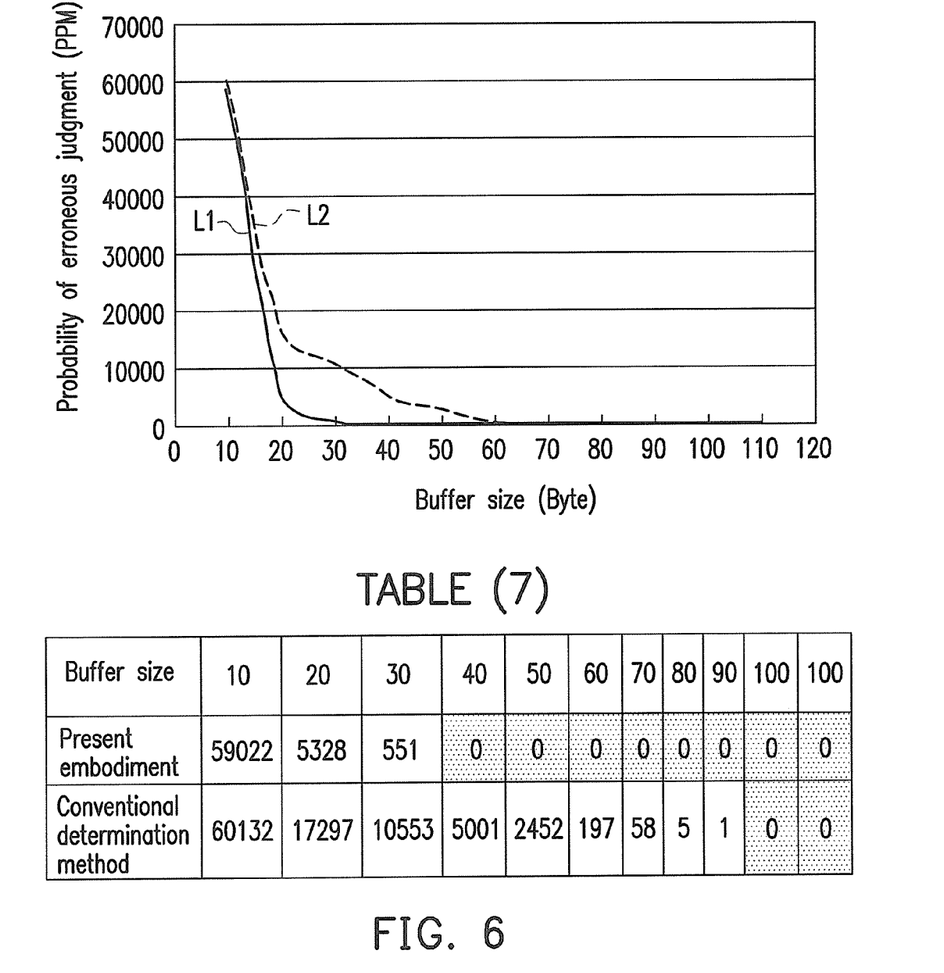
FIG. 6 is a curve diagram illustrating probabilities of erroneous judgement generated based on different buffer sizes according to an embodiment of the invention.

Moreover, an example is provided for backing the embodiment of the invention, by which the correct sampling rate SR can be rapidly determined, and a probability of erroneous judgment and a use of the memory can be reduced. Referring to FIG. 6, FIG. 6 is a curve diagram illustrating probabilities of erroneous judgement generated based on different buffer sizes according to an embodiment of the invention. A table (7) is also included in FIG. 6 for digitalizing information of FIG. 6. A horizontal axis of FIG. 6 represents buffer sizes in the storage unit 520, and a byte is taken as a unit. A vertical axis of FIG. 6 represents probabilities of erroneous judgment according to the present embodiment and a conventional determination method, and the number of erroneous judgments per million times (i.e. PPM) is taken as a unit. A solid line curve L1 represents an experiment result of the present embodiment, and a dashed line curve L2 represents an experiment result of the conventional determination method.

Referring to FIG. 6 and the table (7), when the buffer size of 40 bytes in the storage unit 520 is used as the memory for determining the sampling rate SR, the sampling rate SR can be correctly determined, though the conventional determination method requires 100 bytes for correctly determining the sampling rate SR. Moreover, the probability of erroneous judgement of the solid line curve L1 corresponding to each different buffer size is less than that of the dashed line curve L2, so that compared to the conventional determination method, the present embodiment has advantages of relatively less time used for determination, low probability of erroneous judgement, and less memory required for determination.

In summary, in the embodiments of the invention, multiple values are obtained according to the bi-phase clock frequencies of different time points, and the weighted sequences are adjusted according to filter ranges, so as to calculate the first weighted average and the second weighted average according to the weighted sequences and the multiple values. Then, a sampling rate tendency of the input signal is determined according to the first weighted average, the second weighted average and the frequency threshold. When a difference between the first weighted average and the frequency threshold is greater than a difference between the second weighted average and the frequency threshold, it represents that the multiple values tend to be greater than the frequency threshold, so that the sampling rate is set to 44.1 KHz. Conversely, when the difference between the first weighted average and the frequency threshold is smaller than the difference between the second weighted average and the frequency threshold, it represents that the multiple values tend to be smaller than the frequency threshold, so that the sampling rate is set to 48 KHz, so as to reduce a probability of erroneous judgment and rapidly determine the sampling rate to save the required memory.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for determining a sampling rate, used for determining a sampling rate of an input signal of a Sony/Philips digital interface (SPDIF), the method for determining the sampling rate comprising:
   obtaining a plurality of multiple values according to a plurality of bi-phase clock frequencies of the input signal at different time points and a system frequency;
   producing a first weighted sequence and a second weighted sequence respectively having weighted values corresponding to the multiple values;
   adjusting a first weighted sequence according to a first filter range, and calculating a first weighted average according to the adjusted first weighted sequence and the multiple values, adjusting a second weighted sequence according to a second filter range, and calculating a second weighted average according to the adjusted second weighted sequence and the multiple values;
   calculating a first difference according to the first weighted average and a frequency threshold, and calculating a second difference according to the second weighted average and the frequency threshold; and
   setting the sampling rate to a first sampling rate when a first difference is greater than a second difference, and otherwise setting the sampling rate to a second sampling rate.

2. The method for determining the sampling rate as claimed in claim 1, wherein the first filter range is greater than a high-pass threshold, and the second filter range is smaller than a low-pass threshold.

3. The method for determining the sampling rate as claimed in claim 2, wherein the step of adjusting the first weighted sequence according to the first filter range and calculating the first weighted average according to the first weighted sequence and the multiple values comprises:
   removing the multiple values smaller than or equal to the high-pass threshold; and
   calculating an arithmetic average of the remained multiple values to obtain the first weighted average,
   the step of adjusting the second weighted sequence according to the second filter range and calculating the second weighted average according to the second weighted sequence and the multiple values comprises:

removing the multiple values greater than or equal to the low-pass threshold; and calculating an arithmetic average of the remained multiple values to obtain the second weighted average.

4. The method for determining the sampling rate as claimed in claim 1, wherein the first sampling rate is a CD audio sampling rate, and the second sampling rate is a DVD digital audio sampling rate.

5. The method for determining the sampling rate as claimed in claim 1, wherein the step of obtaining the multiple values comprises:

obtaining the bi-phase clock frequencies at different time points according to the input signal; and dividing the system frequency by the bi-phase clock frequencies, so as to obtain the multiple values.

6. The method for determining the sampling rate as claimed in claim 1, wherein the first difference is an absolute value of the first weighted average minus the frequency threshold, and the second difference is an absolute value of the second weighted average minus the frequency threshold.

7. The method for determining the sampling rate as claimed in claim 1, further comprising:

adjusting or changing the first filter range, the second filter range and the frequency threshold according to the system frequency.

8. A device for determining a sampling rate, used for determining a sampling rate of an input signal of a Sony/Philips digital interface (SPDIF), the device for determining the sampling rate comprising:

a frequency sampling unit, for obtaining a plurality of multiple values according to a plurality of bi-phase clock frequencies of the input signal at different time points and a system frequency;

a filter calculation unit, coupled to the frequency sampling unit, for producing a first weighted sequence and a second weighted sequence respectively having weighted values corresponding to the multiple values, adjusting a first weighted sequence according to a first filter range, and calculating a first weighted average according to the adjusted first weighted sequence and the multiple values, and adjusting a second weighted sequence according to a second filter range, and calculating a second weighted average according to the adjusted second weighted sequence and the multiple values; and a determination unit, coupled to the filter calculation unit, for calculating a first difference according to the first weighted average and a frequency threshold, and calculating a second difference according to the second weighted average and the frequency threshold, setting the sampling rate to a first sampling rate when a first difference is greater than a second difference, and otherwise setting the sampling rate to a second sampling rate.

9. The device for determining the sampling rate as claimed in claim 8, wherein the first filter range is greater than a high-pass threshold, and the second filter range is smaller than a low-pass threshold.

10. The device for determining the sampling rate as claimed in claim 9, wherein the filter calculation unit comprises:

a high-pass calculation unit, for removing the multiple values smaller than or equal to the high-pass threshold, and calculating an arithmetic average of the remained multiple values to obtain the first weighted average; and a low-pass calculation unit, for removing the multiple values greater than or equal to the low-pass threshold, and calculating an arithmetic average of the remained multiple values to obtain the second weighted average.

11. The device for determining the sampling rate as claimed in claim 8, further comprising:

a storage unit, coupled to the frequency sampling unit and the determination unit for receiving and storing the multiple values.

12. The device for determining the sampling rate as claimed in claim 8, further comprising:

a coefficient setting unit, coupled to the frequency sampling unit and the filter calculation unit, for adjusting or changing the first filter range, the second filter range and the frequency threshold according to the system frequency.

* * * * *